US009302500B2

(12) United States Patent
Pagones et al.

(10) Patent No.: US 9,302,500 B2
(45) Date of Patent: Apr. 5, 2016

(54) SEALED CARDS AND METHODS OF PRODUCING THE SAME

(71) Applicant: R.R. Donnelley & Sons, Chicago, IL (US)

(72) Inventors: James Harrison Pagones, Slidell, LA (US); Martin E. Lemens, Pleasant Prairie, WI (US)

(73) Assignee: R.R. Donnelley & Sons Company, Chicago, IL (US)

(*) Notice: Subject to any disclaimer, the term of this patent is extended or adjusted under 35 U.S.C. 154(b) by 0 days.

(21) Appl. No.: 14/466,725

(22) Filed: Aug. 22, 2014

(65) Prior Publication Data

US 2014/0361526 A1 Dec. 11, 2014

Related U.S. Application Data

(63) Continuation of application No. 13/338,855, filed on Dec. 28, 2011, now Pat. No. 8,833,662, which is a continuation of application No. 12/203,638, filed on Sep. 3, 2008, now Pat. No. 8,172,146.

(51) Int. Cl.

| | |
|---|---|
| ***G06K 7/00*** | (2006.01) |
| ***B41J 3/60*** | (2006.01) |
| ***B41J 3/407*** | (2006.01) |
| ***B42D 15/02*** | (2006.01) |
| ***B42D 25/00*** | (2014.01) |
| *B42D 25/485* | (2014.01) |

(52) U.S. Cl.

CPC .. *B41J 3/60* (2013.01); *B41J 3/407* (2013.01); *B42D 15/025* (2013.01); *B42D 25/00* (2014.10); *B42D 25/485* (2014.10)

(58) Field of Classification Search

USPC ................ 235/486, 380, 375; 428/42.2, 42.3

See application file for complete search history.

(56) References Cited

U.S. PATENT DOCUMENTS

| | | | |
|---|---|---|---|
| 3,683,806 | A | 8/1972 | Rudolph |
| 3,711,353 | A | 1/1973 | Zimmer |
| 3,864,855 | A | 2/1975 | Pekko et al. |
| 4,060,168 | A | 11/1977 | Romagnoli |
| 4,281,762 | A | 8/1981 | Hattemer |
| 4,379,573 | A | 4/1983 | Lomeli et al. |
| 4,479,838 | A | 10/1984 | Dunsirn et al. |
| 4,544,590 | A | 10/1985 | Egan |
| 4,568,403 | A | 2/1986 | Egan |
| 4,767,654 | A | 8/1988 | Riggsbee |
| 4,810,121 | A | 3/1989 | Uneo et al. |
| 4,846,504 | A | 7/1989 | MacGregor et al. |

(Continued)

OTHER PUBLICATIONS

United States Patent and Trademark Office, "Notice of Allowance," issued in connection with U.S. Appl. No. 12/203,638, mailed on Sep. 21, 2011, 30 pages.

(Continued)

*Primary Examiner* — Ahshik Kim

(74) *Attorney, Agent, or Firm* — Hanley, Flight and Zimmerman, LLC

(57) ABSTRACT

Sealed cards and methods for producing the same are described. An example apparatus includes a first layer including a first side and a second side. The apparatus also includes a second layer an inner portion and an outer portion. The second side of the first layer is coupled to the inner portion of the second layer, the first side covers the inner portion of the second layer, and the first side is to be coupled to a surface to conceal the second layer by the first layer until removal thereof.

19 Claims, 4 Drawing Sheets

(56) References Cited

U.S. PATENT DOCUMENTS

| | | | |
|---|---|---|---|
| 4,863,772 | A | 9/1989 | Cross |
| 4,864,504 | A | 9/1989 | Koshizawa et al. |
| 4,872,707 | A | 10/1989 | deBruin |
| 4,925,714 | A | 5/1990 | Freedman |
| 4,965,438 | A | 10/1990 | Murofushi |
| 4,982,894 | A | 1/1991 | Schmidt |
| 5,011,559 | A | 4/1991 | Felix |
| 5,019,436 | A | 5/1991 | Schramer et al. |
| 5,024,014 | A | 6/1991 | Swierczek |
| 5,106,124 | A | 4/1992 | Volkman et al. |
| 5,131,686 | A | 7/1992 | Carlson |
| 5,237,394 | A | 8/1993 | Eaton |
| 5,238,720 | A | 8/1993 | Volkman |
| 5,239,474 | A | 8/1993 | Eaton, Jr. et al. |
| 5,284,689 | A | 2/1994 | Laurash et al. |
| 5,292,713 | A | 3/1994 | Stenzel et al. |
| 5,329,713 | A | 7/1994 | Lundell |
| 5,350,612 | A | 9/1994 | Stern et al. |
| 5,380,045 | A | 1/1995 | Comann |
| 5,403,236 | A | 4/1995 | Greig |
| 5,413,384 | A | 5/1995 | Principe et al. |
| 5,413,532 | A * | 5/1995 | Raby ................................ 462/2 |
| 5,417,790 | A | 5/1995 | Petrou |
| 5,535,536 | A | 7/1996 | Comann |
| 5,571,358 | A | 11/1996 | Napier et al. |
| 5,608,639 | A | 3/1997 | Twardowski et al. |
| 5,628,858 | A | 5/1997 | Petrou |
| 5,658,631 | A | 8/1997 | Bernstein et al. |
| 5,661,099 | A | 8/1997 | Mitchell, Jr. |
| 5,750,192 | A | 5/1998 | Smith |
| 5,777,305 | A | 7/1998 | Smith et al. |
| 5,824,380 | A | 10/1998 | Hagen |
| 5,853,244 | A | 12/1998 | Hoff et al. |
| 5,855,434 | A | 1/1999 | Hagen |
| 5,915,733 | A | 6/1999 | Schnitzer et al. |
| 5,951,054 | A | 9/1999 | Hagen et al. |
| 6,022,442 | A | 2/2000 | Seidl |
| 6,173,901 | B1 | 1/2001 | McCannel |
| 6,224,108 | B1 | 5/2001 | Klure |
| 6,352,287 | B2 | 3/2002 | Casagrande |
| 6,403,191 | B1 | 6/2002 | Casagrande |
| 6,471,815 | B1 | 10/2002 | Mace |
| 6,594,927 | B2 | 7/2003 | Witkowski |
| 6,640,974 | B2 | 11/2003 | Malone |
| 6,688,649 | B2 | 2/2004 | Casagrande |
| 6,709,726 | B1 | 3/2004 | Dronzek, Jr. et al. |
| 6,756,095 | B2 | 6/2004 | Sandt et al. |
| 6,988,665 | B2 | 1/2006 | Schofield |
| 6,991,259 | B2 | 1/2006 | Schwarzbauer et al. |
| 7,013,589 | B2 | 3/2006 | Dickinson et al. |
| 7,106,202 | B2 | 9/2006 | Dickinson |
| 7,155,854 | B2 | 1/2007 | Dickinson |
| 7,182,259 | B2 | 2/2007 | Lubow et al. |
| 7,399,131 | B2 * | 7/2008 | Klinefelter et al. ........... 400/521 |
| 7,607,574 | B2 | 10/2009 | Kingsborough et al. |
| 8,172,146 | B2 | 5/2012 | Pagones et al. |
| 2001/0035645 | A1 | 11/2001 | Carides et al. |
| 2002/0185212 | A1 | 12/2002 | Schaupp et al. |
| 2003/0020274 | A1 | 1/2003 | Milliorn |
| 2003/0217489 | A1 | 11/2003 | Witkowski |
| 2004/0007557 | A1 | 1/2004 | Maliszewski et al. |
| 2004/0018289 | A1 | 1/2004 | McQueeny et al. |
| 2004/0111934 | A1 | 6/2004 | O'Connell |
| 2004/0155453 | A1 | 8/2004 | Ross |
| 2004/0212190 | A1 | 10/2004 | Miller |
| 2004/0237362 | A1 | 12/2004 | O'Connell |
| 2005/0229450 | A1 | 10/2005 | Larsen et al. |
| 2007/0145142 | A1 | 6/2007 | Lubow et al. |
| 2007/0229236 | A1 | 10/2007 | Mercer et al. |
| 2008/0115465 | A1 | 5/2008 | Dickinson |
| 2010/0051706 | A1 | 3/2010 | Pagones et al. |
| 2012/0172188 | A1 | 7/2012 | Pagones et al. |

OTHER PUBLICATIONS

United States Patent and Trademark Office, "Notice of Allowance," issued in connection with U.S. Appl. No. 12/203,638, mailed on Jan. 19, 2012, 11 pages.

United States Patent and Trademark Office, "Office Action," issued in connection with U.S. Appl. No. 13/338,855, mailed on Dec. 6, 2013, 18 pages.

United States Patent and Trademark Office, "Notice of Allowance," issued in connection with U.S. Appl. No. 13/338,855, mailed on May 12, 2014, 10 pages.

* cited by examiner

SEALED CARDS AND METHODS OF PRODUCING THE SAME

RELATED APPLICATION

This patent arises from a continuation of U.S. patent application Ser. No. 13/338,855, filed Dec. 28, 2011, which is a continuation of U.S. Pat. No. 8,172,146, issued May 8, 2012, both of which are hereby incorporated herein by reference in their entireties.

FIELD OF THE DISCLOSURE

The present disclosure relates generally to forms and, more particularly, to sealed cards and methods of producing the same.

BACKGROUND

In the manufacture of hidden or sealed cards or forms (e.g., forms that are attachable to other forms or products but concealed from view by a label or other material), the cards or forms to be sealed are typically manufactured separately and then wrapped in a material such as a plastic that has a transfer tape applied to one side (e.g., the back of the card or form) for coupling the wrapped card or form to another product. These constructions require several manufacturing steps and result in bulky cards or forms that are difficult to handle using automation machines, are easily detached from the receiving products, and difficult to open.

In addition, a plurality of similar cards or forms may be produced with variable indicia printed thereon such as names of intended recipients or tickets numbered in a sequence. After the printing of such variable indicia, a secondary manufacturing process is typically used to verify that the variable indicia had been properly printed. One known method of verifying variable indicia includes manual verification, which requires a human operator to detect an error and implement corrective measures. In such systems, it is common for an error to go undetected. Furthermore, corrective measures typically require a work stoppage and/or the loss of a potentially large volume of material.

Another known method incorporates automatic verification through a secondary process. The variable indicia is read from each form and compared to information stored in a database. If an error is detected, variable printers are reset to correct the error. In such systems, volumes of material are lost until the printers are reset and/or a third manufacturing process may need to be implemented to reorder the reprinted forms.

DETAILED DESCRIPTION

Figure 1:
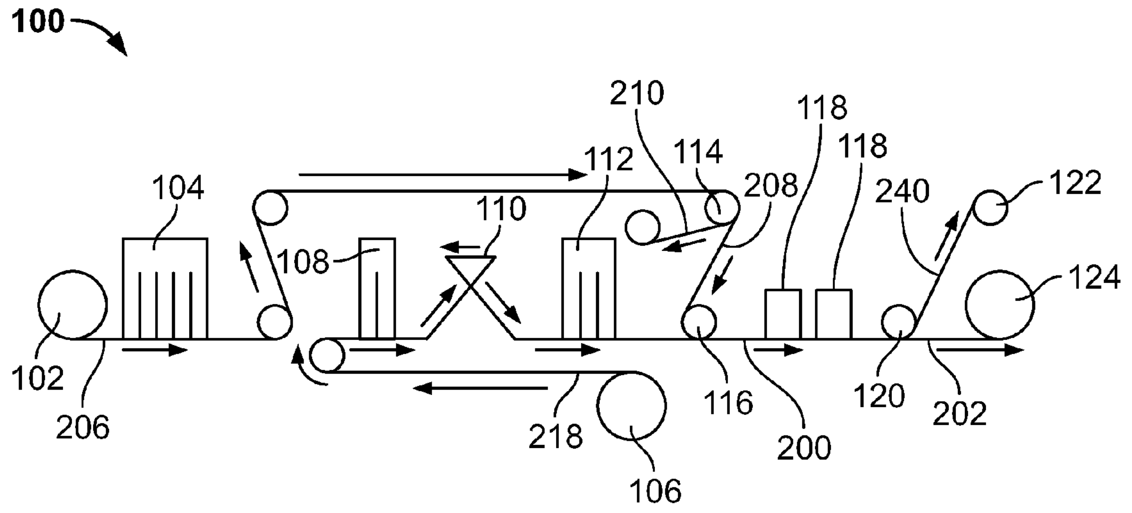
FIG. 1 is a schematic view of an example apparatus for practicing an example method described herein for producing an example sealed card.

Certain examples are shown in the above-identified figures and described in detail below. In describing these examples, like or identical reference numbers may be used to identify common or similar elements. The figures are not necessarily to scale and certain features and certain views of the figures may be shown exaggerated in scale or in schematic for clarity and/or conciseness.

Sealed cards are important for a variety of purposes, such as maintaining the secrecy of sensitive or confidential information and/or protecting a sealed card and the information contained thereon from environmental elements. Sealed cards may also provide non-sensitive information such as marketing information when, for example, the sealed cards are included with various products. In addition, verifying the information contained on a sealed card during the manufacturing process increases the integrity of the product and may reduce manufacturing time, costs, and manufacturing waste.

In general, the example apparatus, methods and articles of manufacture described herein provide for an example sealed card that protects proprietary or otherwise sensitive or confidential information from viewing by unauthorized persons or machines. In addition, the examples provided here protect the example sealed cards from environmental elements including, for example, harsh weather, rough handling, harsh operating conditions, etc.

The example sealed cards described herein also provide a relatively large surface area for the inclusion of more information, including for example, marketing information, than traditional constructions. Furthermore, the example sealed cards described herein have slimmer profiles than many known cards or forms to enable the example sealed cards to be included in a wider variety of products than traditional sealed cards.

In addition, an example method for producing the example sealed cards described herein verifies the printing of the example sealed cards substantially simultaneously with the printing. In such examples, any erroneously printed material can be fixed immediately.

More specifically, an example sealed card described herein includes a first layer having a first side and a second side and a perimeter of weakness formed in the first layer forming an inner area and an outer area. The example sealed card also includes a first indicia on the second side in the inner area and a second indicia to correspond to the first indicia in the outer area. Furthermore, the example sealed card includes a release liner releasably coupled to the second side, wherein the release liner covers the first indicia.

One or more example sealed cards may be printed in sequence to form a web of sealed cards. An example web includes a first layer having a first side and a second side and a first perimeter of weakness formed in the first layer forming a first inner area and a first outer area. The example web also includes a first primary indicia on the second side in the first inner area and a first secondary indicia to correspond to the first primary indicia in the first outer area. In addition, the example web has a second perimeter of weakness formed in the first layer forming a second inner area and a second outer area, a second primary indicia on the second side in the second inner area and a second secondary indicia to correspond to the second primary indicia in the second outer area.

Furthermore, the example web includes a release liner releasably coupled to the second side.

An example method of producing an example web of sealed cards includes feeding a first layer having a first side and a second side into a printer, printing at least one of the first side or the second side and cutting a first perimeter of weakness into the first layer to form a first inner area and a first outer area. In addition, the example method includes printing a first primary indicia on the second side and in the first inner area, and printing a first secondary indicia corresponding to the first primary indicia in the first outer area. Furthermore, the example method includes verifying a correspondence between the first primary indicia and the first secondary indicia. The example also includes cutting a second perimeter of weakness into the first layer to form a second inner area and a second outer area, printing a second primary indicia on the second side and in the second inner area, printing a second secondary indicia corresponding to the second primary indicia in the second outer area, and verifying a correspondence between the second primary indicia and the second secondary indicia. Finally, the example method includes releasably coupling a release liner to the second side.

Figure 2:
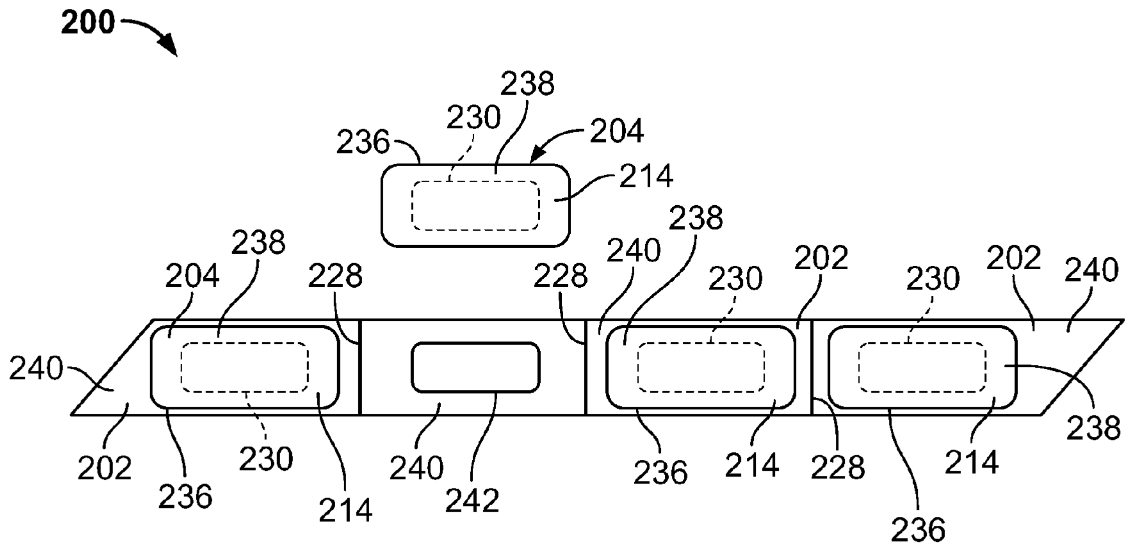
FIG. 2 is a schematic view of a portion of an example web of a plurality of example sealed card intermediates with one example sealed card removed.
Figure 4:
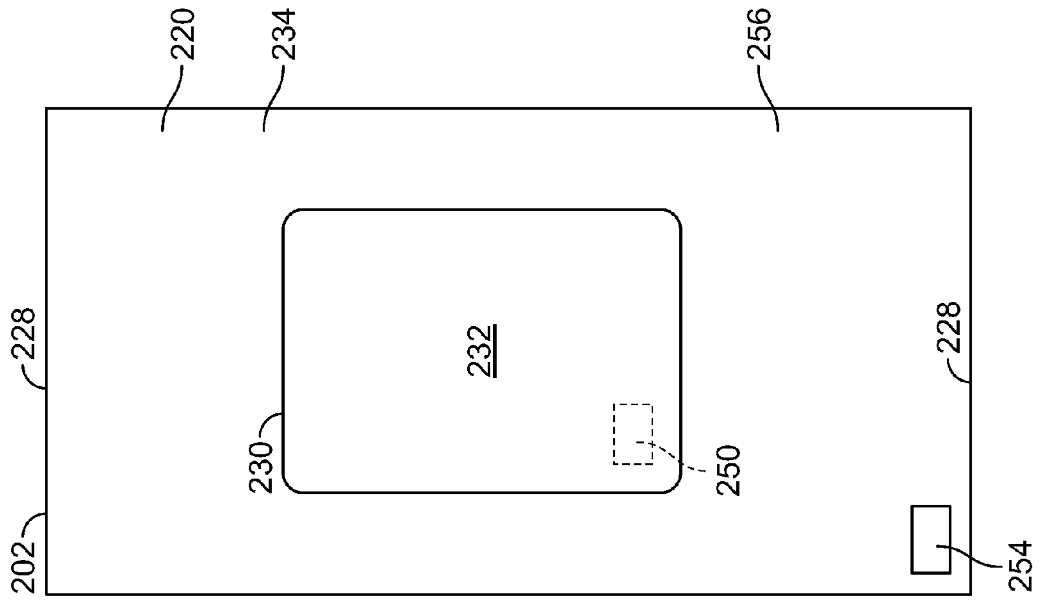
FIG. 4 is a back view of an example sealed card intermediate.
Figure 5:
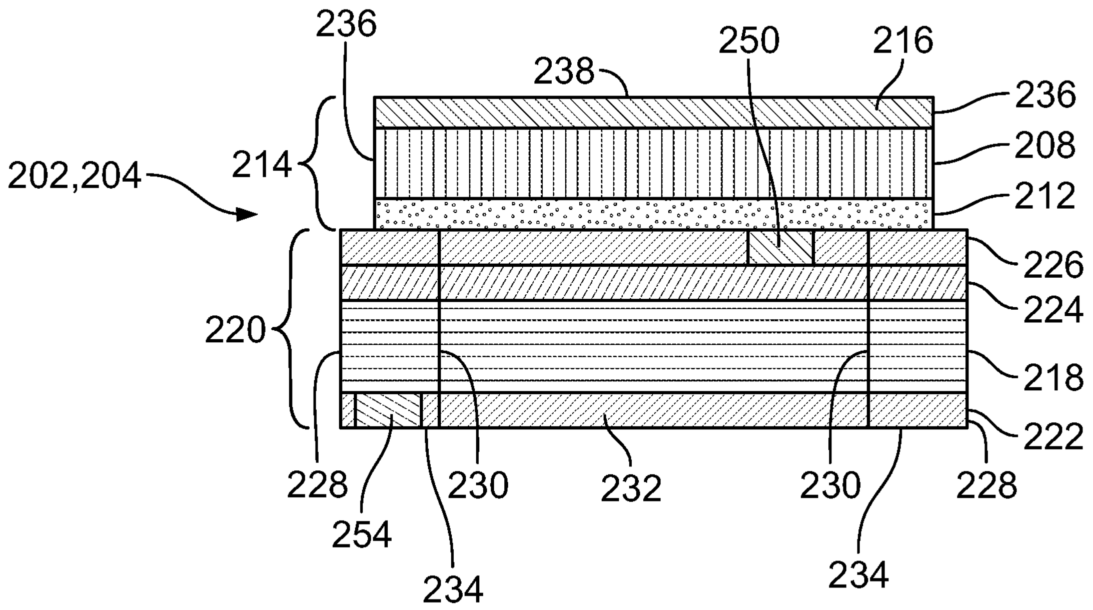
FIG. 5 is a cross-sectional view of an example sealed card intermediate.
Figure 6:
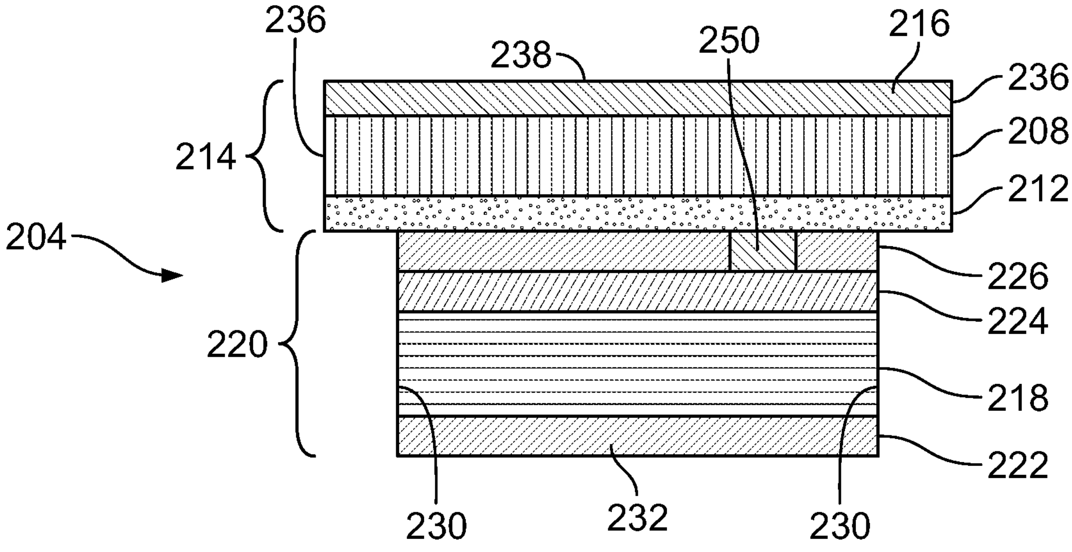
FIG. 6 is a cross-sectional view of an example sealed card.

Now turning to the figures, FIG. 1 illustrates an example apparatus 100 for practicing one of the example methods described herein for producing an example web 200 (FIGS. 1 and 2) containing one or more example sealed card intermediates 202 (FIGS. 2-5), each of which includes an example sealed card 204 (FIGS. 2 and 6). The example sealed card intermediate is an intermediary form or construction that includes or supports the example sealed cards. In some examples, the example sealed card intermediate is the structure in which the example sealed card is provided to a user prior to use of the example sealed cards. In addition, the example sealed cards described herein may be any type of cards, constructions or form including for example, credit card type forms, postcards, reply cards, paper forms, labels, photos, tickets, tags, stickers, etc.

The example apparatus 100 includes a first unwinder 102 that unwinds a top ply 206. The top ply 206 includes a release liner layer 208, which may be, for example, a roll of paper, a plastic material (e.g., polypropylene), other synthetic substrates (e.g., Polyart®) or any other suitable substrate, including a combination of materials, which is coupled to a backing liner 210 via a layer of adhesive 212 (FIG. 5). In this example, the layer of adhesive 212 is a removable layer that may be a continuous layer or a pattern of adhesive. In addition, the adhesive 212 may be a pressure sensitive adhesive or any other suitable adhesive. The release liner 208 and the adhesive 212 form part of a top layer 214 of the sealed card 204. As noted above, the release liner layer 208 may be any suitable material including, for example, polypropylene or any other suitable thermoplastic polymer. In one example, the top ply 206 includes polypropylene with about a 2.6 mil caliper and about a 50 # liner. More specifically, the top ply 206 may be, for example, RR Donnelley code 1305, which corresponds to 2.6 mil polypropylene 50 # LF spec #2650 PPX MR1.

The top ply 206 runs through one or more first print stations 104 that add a first printed indicia layer 216 on a side of the release liner 208. The top ply 206 is further treated as detailed below.

A second unwinder 106 unwinds a bottom ply 218 that forms part of a base layer 220 of the example sealed card 204. The bottom ply 218 may be, for example, a roll of paper, a plastic material (e.g., polypropylene), other synthetic substrates (e.g., Polyart®) or any other suitable substrate including a combination of materials. In one example, the bottom ply 218 may be a synthetic paper that is a multi-layered, biaxially oriented film that is durable, uniform, opaque, chemical-resistant, UV-resistant, waterproof and provides a high quality print surface. The bottom ply 220 may have a basis weight of, for example, about 135.10 lbs/ream; a caliper of, for example, about 9.8 mils; a yield of, for example, about 3.52 msi/lb; a tear strength of, for example, about 158.0 MD/64.0 CD grams; a tensile strength of, for example, about 61.5 MD/195.8 CD lbs/in; an opacity of, for example, about 99%; and a gloss of, for example, about 19 gloss units. More specifically, the bottom ply 218 may be, for example, Fasson 10 mil FPG 250 YUPO spec #76785.

The bottom ply 218 is sent through one or more second print stations 108, which may be the same as or in addition to the first print stations 104. The second print stations 108 add a second printed indicia layer 222 to the bottom ply 218. Optionally, the bottom ply 214 may be sent through a turn bar 110 that inverts the bottom ply 218. Thereafter, the bottom ply 218 may be fed through a third set of printer stations 112 that may be the same as or in addition to the first print stations 104 and/or second print stations 108. The third print stations 112 add a third printed indicia layer 224 to the bottom ply 218.

The first, second and/or third print stations 104, 108, and/or 112 may include inkjet printer(s), thermal printer(s), and/or any other suitable printer(s). The printed indicia layers 216, 222 and 224 may include any suitable type of information including, for example, marketing information, variable print, personalized message(s), instruction(s), direction(s), coupon(s) and/or any other information including letter(s), number(s), image(s), shape(s), etc.

In some examples, as described in greater detail below, one or more of the printed indicia layers 216, 222, and 224 may include first and second primary indicia and/or first and second secondary indicia that is used to verify proper printing of the printed indicia layers 216, 222 and 224. Furthermore, the printing of any of the indicia layers 216, 222 and 224 or the first and second primary indicia and first and second secondary indicia may occur at any point during the example methods described herein and/or via an imaging process separate from the described manufacturing process, which may be, for example, a separate off-line process or a direct in-line process. A separate off-line process may allow greater flexibility and/or reduce costs by allowing a client to image the sealed cards. In such examples, the printed indicia layers 216, 222, and 224 may only include first and second primary indicia and/or first and second secondary indicia, and the client adds all other marketing information, variable print, etc.

The example apparatus 100 also includes a first stripper 114 that separates the release liner 208 and adhesive layer 212 of the top ply 206 from the backing liner 210. The release liner 208 and the adhesive layer 212 are then coupled (e.g., pressed, laminated, or otherwise coupled) via a press 116. Prior to pressing the release liner 208 and adhesive layer 212 of the top part 214 with the base ply 218 of the bottom part 220, a release coating such as, for example, a release coating 226 may be applied between the top part 214 and the bottom part 220 (FIG. 5). After the press 116, the top part 214 and bottom part 220 form the web 200 of sealed card intermediates 202.

The release coating 226 may be, for example, silicone. More specifically, the release coating 226 may be, for example, a UV silicone release coating that is cured by a free-radical mechanism. In one specific example, the release coating 226 is a Craigcoat 1021A UV release coating. In some examples, the release coating 226 may be applied via an anilox roll such as, for example, an anilox roll with about 550 line (i.e., a 550 line screen or number of cells per linear inch measured along the engraving angle) and about 3.5 BCM volume (i.e., about 3.5 billion cubic microns per square inch, which is the ink carrying capacity of a cell as determined by the depth, diameter and profile of the cell multiplied by the number of cells in a given square inch of roll surface). However, the weight of the release coating 226 may vary.

Varying amounts of a release material such as, for example, silicone, are used depending on the nature of the substrate of the release liner 208 and/or the base ply 218. In addition, with some constructions, for example paper substrates, the release coating 226 may be applied, for example, by a direct thermal or a thermal transfer process. This combination of materials in this construction allows the sealed card intermediate 202 to maintain its form and endure a rewind process for storage and/or shipping, as detailed below. In other words, the sealed card intermediates 202 can be rolled about a core, for example, without creating an unwieldy bulky and/or misshapen roll and/or without the sealed card 204 displacing or otherwise decoupling from the bottom portion 22 and outer area 234. In addition, the sealed card intermediate 202 can be used in a dispensing device by an end-user with these same benefits.

The web 200 of sealed card intermediates 202 passes through a cutter 118 that die-cuts, kiss-cuts, perforates and/or otherwise adds one or more line(s) or perimeter(s) of weakness to the web 200. For example, a first line of weakness 228 may be formed through the top part 214 and the bottom part 220 at intervals to form and separate the sealed card intermediates 202. In the illustrated example, the first line of weakness 228 is a straight line. However, any other shape (e.g., diagonal lines) may be used in addition to or as an alternative to a straight line. In addition, prior to adding the line(s) of weakness 228, a black line, notch or other indicator may be added to the top portion 214 and/or the bottom portion 220 to indicate the beginning of the next (e.g., adjacent) sealed card intermediate 202. The indicator may be used to indicate both variable printing and/or the line(s) of weakness 228. The indicator may be added by one or more of the printing stations 104, 108 or 112 or by another component such as, for example, a preliminary cutter (not shown).

In addition, the cutter 118 may add a second line of weakness 230 through the bottom part 220. In the illustrated example, the second line of weakness 230 has a generally rectangular shape, though any other shape may be used additionally or alternatively. In the illustrated example, the second line of weakness 230 separates the bottom part 220 into an inner area 232 and the outer area 234. This is repeated on each sealed card intermediate 202 such that additional lines or perimeters of weakness are formed in the bottom part 220 down the web 200 forming a second inner area, a second outer area, a third inner area, a third outer area, and so forth.

The cutter 118 also adds a third line of weakness 236 through the top part 214 of the sealed card intermediate 202. The third line of weakness 236 separates the release liner 208 into a release label portion 238 and a waste matrix 240. In the illustrated example, the third line of weakness 236 forms an area larger than the area of the second line of weakness 230. Consequently, the release label portion 238 is larger than the inner portion 232, which enables the release label portion 238 to conceal the inner portion 232 as detailed below.

Figure 3:
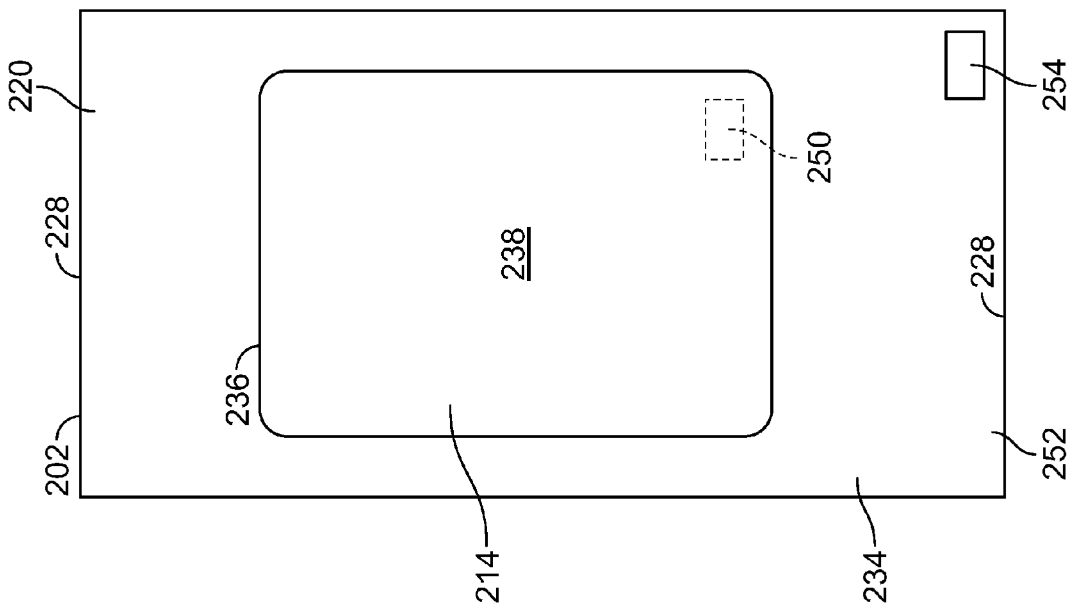
FIG. 3 is a front view of an example sealed card intermediate.

After the cutter 118, a second stripper 120 separates the waste matrix 240 from the release label portion 238 and the rest of the sealed card intermediate 202. The waste matrix 240 may be wound around a first rewinder 122 for later disposal or alternative uses. The sealed card intermediates 202 are sent to a packager 124 that winds, folds, or otherwise prepares the web 200 for shipping and/or storage. FIG. 2 illustrates the web 200 with the waste matrix 240 coupled thereto, while FIG. 3 shows an isolated sealed card intermediate 202 with the waste matrix 240 removed. The sealed card intermediates 202 may be sent stacked, folded, wound in a roll, or otherwise packages and shipped to a purchaser for later use such as, for example, inclusion on to a receiving product (e.g., a car battery, a piece of furniture, an envelope, a business form, an electronic device, an appliance, etc.). Alternatively, the matrix 240 may be removed by the end-user or left adhered to the bottom portion 220.

To use the sealed cards 204, the sealed cards 204 are removed from the sealed card intermediates 202 as shown in FIGS. 2 and 6 (leaving an opening 242 in the bottom portion 220). That is, the release label portion 238 and the inner area 232 are separated from the outer area 234 (along with the intermediary and/or auxiliary layers shown in FIG. 6). The example sealed card 204 may then be coupled to a receiving product (not shown) such as, for example, by coupling the exposed portions of the adhesive layer 212 to the product with the inner portion 232 disposed between the product and the release label portion 238. The second and/or third printed indicia layers 222 and 226 may include any type of information including, for example, warranty and/or repair information. The first printed indicia layer 216 may also include any type of information such as, for example, information relating to the information included in the second and/or third printed indicia layers 222 and 226. In addition, the release label portion 238 fully covers or substantially covers all of the inner portion 232, which protects the inner portion 232 and the information contained therein from exposure to unauthorized persons or machines, environmental conditions such as, for example, the high operating temperatures and presence of oil and grease in an automobile engine.

To access the information included in the second and/or third printed indicia layers 222 and 226, the release label portion 238 is pulled away to reveal the inner portion 232. The inner portion 232 may be removed from the product and placed in another place or area such as, for example, in a filing cabinet, wallet, drawer, etc. In addition, the inner portion 232 may be returned to the position under the release label portion 238 for storage thereunder.

The example sealed card 204 may be used with many other industries as well as in many other environments. For example, the example sealed cards 204 may be used to provide warranty and/or instructional information for a product; to provide membership cards with sensitive or confidential information such as, for example, health insurance numbers, Social Security Numbers or other identification information; to provide discount cards on directories, magazines, catalogs, books and/or direct mailings; to provide spare parts information, numbers and/or ordering information; to provide important numbers such as health care provider information or directories; to protect invoice and/or shipping information on parcels; etc. The example sealed cards may be customized for any industry and personalized for various clients, consumers, prospective consumers, etc.

In some of the foregoing examples (e.g., the uses of the example sealed card 204 with product serial numbers or personalized information) or in other examples (e.g., use of the example sealed card 204 with game pieces, lotteries, raffles, etc.), it is important that the variable information (e.g., Social Security Number, winning ticket number, etc.) printed on each sealed card 204 of the web 200 contain the exact correct information to avoid situations in which one person receives someone else's Social Security information or duplicative winning tickets are produced, or any other undesired situation. To avoid such undesired situations, the variable information on each sealed card 204 is verified as one or more of the printed indicia layers 216, 222, and 224 are printed.

One example verification method and system includes the printing of a primary indicia 250 on a first side 252 of the bottom portion 220 in the inner area 232. A secondary indicia 254 corresponding to the primary indicia 250 is printed in the outer area 234 on the first side 252 and/or a second side 256 of the bottom portion 220. The release liner label 238 is releasably coupled to the first side 252, as noted above, and covers the primary indicia. Prior to coupling the release liner label 238, i.e., the top portion 214, the correspondence between the primary indicia 250 and the secondary indicia 254 is verified by reading the primary indicia 250 and the secondary indicia 254 with any suitable reading means and comparing the read information to determine if the primary indicia 250 and the secondary indicia 254 correspond (e.g., match, relate, etc.).

In some examples, the primary zindicia 250 and the secondary indicia 254 are identical and in other examples they are different, though they correspond in some manner. For example, in some examples, both the primary indicia 250 and the secondary indicia 254 are identical bar codes. In other examples, the primary indicia 250 is human readable text while the secondary indicia 254 is a bar code detailing the same or similar information. In some examples, the release liner label portion 238 covers the secondary indicia 254 in addition to or as an alternative to covering the primary indicia 250. In addition, either or both of the primary indicia 250 and the secondary indicia 254 may include a bar code (as noted above), a number, an image, variable print, or any other text, character(s), notch(es), or code(s).

In some examples, the correspondence between the primary indicia 250 and the secondary indicia 254 is verified substantially simultaneously with the printing of the primary indicia 250 and/or the secondary indicia 254. If it is determined that there is no correspondence between the primary indicia 250 and the secondary indicia 254, one or more of the primary indicia 250 and the secondary indicia 254 is voided by, for example, reversing the direction of the web 200 through the printer and/or moving a print head (not shown) forward along the web 200 to print over the defective sealed card intermediate 202. In such a situation, the next sealed card intermediate 202 may be used to reprint the erroneously printed sealed card 204 so that the defect is corrected substantially simultaneously without the loss (or a significant loss) of production time, costs and materials.

Furthermore, after the primary indicia 250 and the secondary indicia 254 are printed and the correspondence therebetween is verified, the web 200 advances to print the next sealed card intermediate 202. The next card is printed with a second primary indicia and a second secondary indicia in a manner similar to that described above with respect to the primary indicia 250 and the secondary indicia 254. The following sealed card intermediate 202 is printed with a third primary indicia and a third secondary indicia once the correspondence between the second primary indicia and second secondary indicia is verified and so forth.

Figure 7:
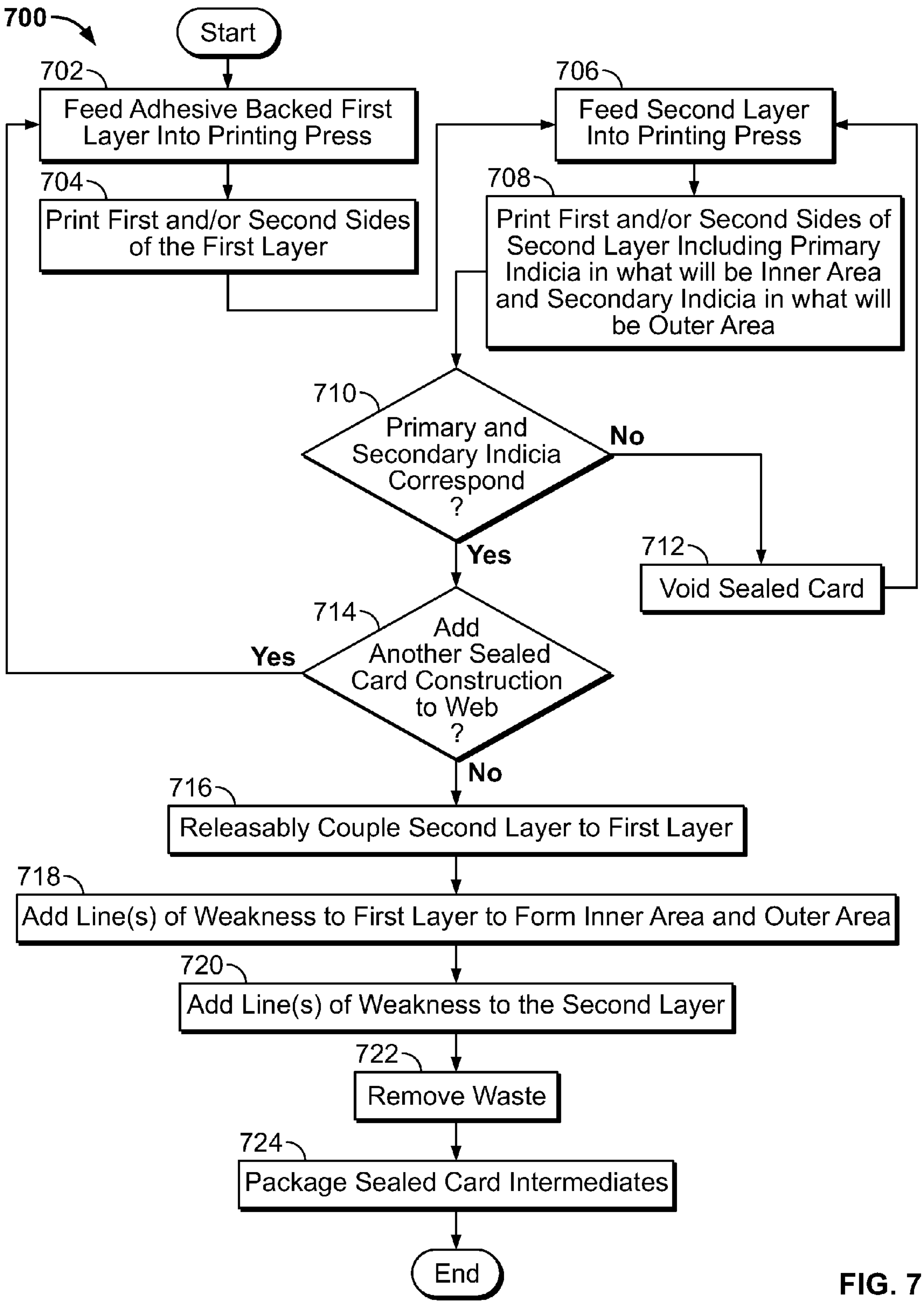
FIG. 7 is a flow chart depicting an example process to produce an example web of example sealed card intermediates.

FIG. 7 is a flow chart of an example process 700 for creating a web of sealed cards such as, for example, the web 200 of the sealed cards 204 discussed above. Although the example systems or processes are described with reference to the flow chart illustrated in FIG. 7, persons of ordinary skill in the art will readily appreciate that many other methods of creating a web of sealed cards may alternatively be used. For example, the order of execution of the blocks may be changed, and/or some of the blocks described may be changed, eliminated or combined.

In the example process 700 described in FIG. 7, a first layer, e.g., the top ply 206 of FIG. 1, is fed into a printing press, e.g., the first printer station 104, (block 702) and a first and/or second side of the first layer is printed (block 704). A second layer, e.g., the bottom ply 218 of FIG. 1 is fed into a printing press, e.g., the second printer station 108 and/or the third printer station 112 of FIG. 1 (block 706) where a first and/or second side of the second layer is printed (block 708). The printed indicia printed by the second and/or third printing press is primary and/or secondary indicia, e.g., the primary indicia 250 and the secondary indicia 254 of FIGS. 3-6 in what will be an inner and an outer area of the second layer, e.g., the inner area 232 and outer area 234 of the bottom part 220 of FIGS. 3 and 4 (block 708).

The primary indicia and secondary indicia are compared to verify if they correspond (block 710). If the primary indicia and the secondary indicia do not correspond (e.g., match) the sealed card with the defect is voided (block 712) by, for example, reversing the direction of advancement through the printers or moving the printers and printing X's, the word "VOID" or some other indication on the sealed card or by otherwise destroying the sealed card. When a sealed card has been voided (block 712), control returns to block 706 in which the second layer is advanced into the printing press.

Where the primary indicia and the secondary indicia correspond, it is determined if an additional sealed card is to be included in the web (block 714). If so, control returns to block 702 in which the first layer is fed into the printing press. If the order is complete, i.e., no further sealed cards are to be included in the web, the first and second layers are pressed together by, for example, the press 116 of FIG. 1 (block 716). This may occur after a backing liner is removed from the first layer in those examples in which a first layer includes a backing liner (e.g., as detailed above with respect to FIG. 1). In some examples, portions of the first and second layers are coupled (block 716) as other portions of the first and second layers are printed and otherwise treated as noted above and below (blocks 702-714, 718-724).

Lines of weakness, e.g., the line(s) or perimeter(s) of weakness 230 and 228 are added by, for example, the cutter 118 of FIG. 1, to the second layer, e.g., the bottom portion 220, to separate individual sealed card intermediates and to form an inner and outer region of the second layer, i.e., the inner and outer regions 232 and 234, respectively of the bottom portion 220 of FIGS. 2-6 (block 718). Similarly, lines of weakness, e.g., the line of weakness 236 is added to the first layer by, e.g., the cutter 118 of FIG. 1, to form a release label, e.g., the release label portion 238, which produces a waste matrix, e.g., the waste matrix 240 (block 720).

The waste matrix may be removed, e.g., by the splitter 120 of FIG. 1 (block 722) and the remaining sealed card intermediates on the web are packaged for shipping and/or storage (block 724) by, for example, separating the sealed card intermediates and stacking them, folding the web, and/or rolling the web, as discussed above.

The example apparatus and methods described herein may be used to produce a plurality of sealed cards that include variable indicia including, for example, a numbered sequence of cards or tickets. In the examples described herein, the variable printing on the sealed cards can be verified to ensure that defective cards are voided, that no numbers are missing from a sequence, that duplicative numbers are not included, etc.

In addition, the example sealed cards 204 described herein include the relatively large release label portion 238 that provides a relatively large area for the inclusion of additional information such as, for example, marketing information, than prior forms that are wrapped in other packaging. In addition, the release label portion is much thinner than prior bulky packaging and allows the example sealed cards to lie relatively flat on a surface of the product to which the sealed cards are applied or adhered.

Although certain example methods, apparatus, and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

We claim:

1. An apparatus, comprising:
a first layer, including:
a first side; and
a second side; and
a second layer, including:
an inner portion; and
an outer portion, the first side of the first layer is coupled to the inner portion of the second layer, the first side covers the inner portion of the second layer, and the first side is to be coupled to a surface to conceal the second layer by the first layer until removal thereof;
a first indicia on the inner portion of the second layer and a second indicia on the outer portion of the second layer, the first indicia corresponding to the second indicia.

2. The apparatus of claim 1, wherein the inner portion includes a first face and the outer portion includes a first face and the first and second indicia are disposed on the respective first faces of the inner portion and the outer portion.

3. The apparatus of claim 1, wherein the first side of first layer includes a release label portion.

4. The apparatus of claim 1, wherein the second layer includes a card including at least one of warranty information, instructional information, membership information, sensitive information, confidential information, identification information, or discount information.

5. An apparatus, comprising:
a first layer, including:
a first side; and
a second side; and
a second layer, including:
an inner portion; and
an outer portion, the first side of the first layer is coupled to the inner portion of the second layer, the first side covers the inner portion of the second layer, and the first side is to be coupled to a surface to conceal the second layer by the first layer until removal thereof, wherein the first side includes adhesive to enable the first side to be coupled to the surface.

6. The apparatus of claim 5, further including instructions on the first layer to remove the first layer to expose the second layer.

7. The apparatus of claim 5, wherein first and second indicia are disposed on a first face of the respective ones of the inner portion and the outer portion.

8. The apparatus of claim 5, wherein the first side includes a release label portion.

9. The apparatus of claim 5, further including indicia on at least one of a first side or a second side of the inner portion.

10. The apparatus of claim 5, wherein the second layer includes a card including at least one of warranty information, instructional information, membership information, sensitive information, confidential information, identification information, or discount information.

11. An apparatus, comprising:
a first portion of a first layer of a web of sealed card assemblies;
a second portion of the first layer coupled to a first portion of a second layer, and covering the first portion of the second layer, the first portion of the first layer to be coupled to a first surface to conceal the first portion of the second layer by the first and second portions of the first layer until removal thereof;
a third portion of the first layer; and
a fourth portion of the first layer coupled to a second portion of the second layer, and covering the second portion of the second layer, the third portion of the first layer to be coupled to a second surface to conceal the second portion of the second layer by the third and fourth portions of the first layer until removal thereof;
a first indicia on a first side of the first portion of the second layer and a second indicia on a second side of the first portion of the second layer, the first indicia corresponding to the second indicia.

12. The apparatus of claim 11, wherein the first side includes an inner portion of the second portion and the second side includes an outer portion of the second portion.

13. The apparatus of claim 11, wherein the second layer includes a card including at least one of warranty information, instructional information, membership information, sensitive information, confidential information, identification information, or discount information.

14. The apparatus of claim 11, wherein the first portion of the first layer includes a release label portion.

15. An apparatus of, comprising:
a first portion of a first layer of a web of sealed card assemblies;
a second portion of the first layer coupled to a first portion of a second layer, and covering the first portion of the second layer, the first portion of the first layer to be coupled to a first surface to conceal the first portion of the second layer by the first and second portions of the first layer until removal thereof;
a third portion of the first layer; and
a fourth portion of the first layer coupled to a second portion of the second layer, and covering the second portion of the second layer, the third portion of the first layer to be coupled to a second surface to conceal the second portion of the second layer by the third and fourth portions of the first layer until removal thereof, wherein the first portion of the first layer includes adhesive to enable the first portion to be coupled to the surface.

16. The apparatus of claim 15, wherein the first portion of the first layer includes a release label portion.

17. The apparatus of claim 16, further including indicia on at least one of a first or a second of the first portion of the second portion.

18. The apparatus of claim 15, wherein the second layer includes a card including at least one of warranty information, instructional information, membership information, sensitive information, confidential information, identification information or discount information.

19. The apparatus of claim 15, further including a first indicia on a first side of the first portion of the second layer and a second indicia on a second side of the first portion of the second layer, the first indicia corresponding to the second indicia.

* * * * *